(12) United States Patent
Jung et al.

(10) Patent No.: US 8,526,322 B2
(45) Date of Patent: Sep. 3, 2013

(54) APPARATUS AND METHOD FOR REPORTING MEASUREMENT RESULT IN WIRELESS COMMUNICATION SYSTEM

(75) Inventors: Sung Hoon Jung, Anyang-si (KR); Sung Duck Chun, Anyang-si (KR); Seung June Yi, Anyang-si (KR); Young Dae Lee, Anyang-si (KR); Sung Jun Park, Anyang-si (KR)

(73) Assignee: LG Electronics Inc., Seoul (KR)

(*) Notice: Subject to any disclaimer, the term of this patent is extended or adjusted under 35 U.S.C. 154(b) by 73 days.

(21) Appl. No.: 13/375,468

(22) PCT Filed: May 31, 2010

(86) PCT No.: PCT/KR2010/003449
§ 371 (c)(1),
(2), (4) Date: Nov. 30, 2011

(87) PCT Pub. No.: WO2010/140797
PCT Pub. Date: Dec. 9, 2010

(65) Prior Publication Data
US 2012/0076041 A1    Mar. 29, 2012

Related U.S. Application Data

(60) Provisional application No. 61/220,565, filed on Jun. 25, 2009, provisional application No. 61/186,886, filed on Jun. 14, 2009, provisional application No. 61/184,299, filed on Jun. 4, 2009, provisional application No. 61/183,061, filed on Jun. 1, 2009.

(30) Foreign Application Priority Data

May 27, 2010   (KR) ........................ 10-2010-0049664

(51) Int. Cl.
*H04L 1/00* (2006.01)
*H04L 12/26* (2006.01)
*H04W 4/00* (2009.01)

(52) U.S. Cl.
USPC .......................... 370/252; 370/254; 370/328

(58) Field of Classification Search
USPC ........................................ 370/252, 254, 328
See application file for complete search history.

(56) References Cited

U.S. PATENT DOCUMENTS

| | | | |
|---|---|---|---|
| 2006/0153079 A1 | 7/2006 | Yoon et al. | |
| 2009/0036116 A1 | 2/2009 | Kim et al. | |
| 2009/0060081 A1* | 3/2009 | Zhang et al. | 375/267 |
| 2010/0232373 A1* | 9/2010 | Nory et al. | 370/329 |
| 2011/0141940 A1* | 6/2011 | Kim et al. | 370/252 |

FOREIGN PATENT DOCUMENTS

| | | |
|---|---|---|
| WO | 2005/074312 | 8/2005 |
| WO | 2007/066883 | 6/2007 |

* cited by examiner

*Primary Examiner* — Ronald Abelson
(74) *Attorney, Agent, or Firm* — Lee, Hong, Degerman, Kang & Waimey

(57) ABSTRACT

A method and apparatus of reporting a measurement result in a wireless communication system is provided. A user equipment receives, from a base station, measurement configuration information comprising a reporting condition for triggering reporting of a measurement result on M component carriers among N component carriers, where M≦N. The user equipment determines whether the reporting condition is satisfied by measuring the N component carriers. If the reporting condition is satisfied, the user equipment reports a measurement result on the M component carriers to the base station.

8 Claims, 13 Drawing Sheets

APPARATUS AND METHOD FOR REPORTING MEASUREMENT RESULT IN WIRELESS COMMUNICATION SYSTEM

CROSS-REFERENCE TO RELATED APPLICATIONS

This application is a 371 U.S. national stage application of International Application No. PCT/KR2010/003449, filed on May 31, 2010, which claims the benefit of earlier filing date and right of priority to Korean Application Serial No. 10-2010-0049664, filed on May 27, 2010, and U.S. Provisional Application Ser. Nos. 61/220,565, filed on Jun. 25, 2009, 61/186,886, filed on Jun. 14, 2009, 61/184,299, filed on Jun. 4, 2009, and 61/183,061, filed on Jun. 1, 2009, the contents of which are all incorporated by reference herein in their entirety.

TECHNICAL FIELD

The present invention relates to wireless communications, and more particularly, to a method and apparatus for reporting a measurement result in a wireless communication system.

BACKGROUND ART

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The 3GPP LTE-A employs various techniques such as carrier aggregation, relay, etc. The 3GPP LTE system is a single carrier system supporting only one bandwidth (i.e., one component carrier) among {1.4, 3, 5, 10, 15, 20} MHz. On the other hand, the LTE-A employs multiple carriers using carrier aggregation. The carrier is defined with a center frequency and a bandwidth. A multiple-carrier system uses a plurality of component carriers having a narrower bandwidth than a full bandwidth.

A user equipment (UE) persistently performs measurement to maintain quality of a radio link with a serving cell from which the UE receives a service. A cell or frequency to be measured is referred to as a measurement object, and is associated with a reporting configuration for independently triggering reporting of a measurement result for each measurement object. The UE performs measurement on the measurement objects, and when the reporting configuration is satisfied, reports the measurement result to a base station (BS).

In the conventional measurement configuration structure, the reporting configuration can be associated with only one measurement object.

When measurement objects and reporting configurations are associated with each other in a one-to-one manner, the UE reports a measurement result individually to each measurement object, and if the number of measurement objects increases, the number of times of transmitting a measurement report message by the UE also increases. If the reporting configuration includes an inappropriate configuration value, measurement reporting of the UE may be excessively frequently triggered or, on the contrary, reporting of the measurement result may be significantly delayed.

When reporting configurations are independently associated with respective component carriers in a multiple carrier system, an overload for reporting a measurement result may increase as the number of component carriers increases.

In addition, according to capability of the UE or a cell environment, the UE does not have to use all of the plurality of component carriers.

Accordingly, there is a need for a method capable of more effectively reporting a measurement result on a plurality of component carriers in a wireless communication system.

DISCLOSURE OF INVENTION

Technical Problem

The present invention provides a method and apparatus for reporting a measurement result on a plurality of component carriers in a wireless communication system.

The present invention also provides a method and apparatus for configuring measurement on a plurality of component carriers in a wireless communication system.

Solution To Problem

In an aspect, a method of reporting a measurement result in a wireless communication system is provided. The method includes receiving, from a base station, measurement configuration information comprising a reporting condition for triggering reporting of a measurement result on M component carriers among N component carriers, where M≦N, determining whether the reporting condition is satisfied by measuring the N component carriers, and if the reporting condition is satisfied, reporting a measurement result on the M component carriers to the base station.

The M component carriers may be component carriers with best quality among the N component carriers.

Whether the reporting condition is satisfied may be determined periodically.

The reporting condition may be to trigger the reporting of the measurement result when the M component carriers are determined The reporting condition may be to trigger the reporting of the measurement result when newly selected M component carriers are different from previously reported M component carriers.

The reporting condition may be to trigger the reporting of the measurement result when an order of quality of newly selected M component carriers is different from an order of quality of previously reported M component carriers.

In another aspect, a user equipment for reporting a measurement result in a wireless communication system is provided. The user equipment includes a radio frequency (RF) unit for transmitting and receiving a radio signal, and a processor operatively coupled to the RF unit and configure to implement a radio interface protocol. The processor is configured to receive, from a base station, measurement configuration information comprising a reporting condition for triggering reporting of a measurement result on M component carriers among N component carriers, where M≦N, determine whether the reporting condition is satisfied by measuring the N component carriers, and if the reporting condition is satisfied, report a measurement result on the M component carriers to the base station.

Advantageous Effects Of Invention

A measurement model for a plurality of component carriers is proposed in a multiple carrier system, and a mutual quality relation can be taken into account among cells having a criterion for reporting a measurement result across several frequencies. A user equipment (UE) can provide a measurement result on an optimized component carrier group to a base station (BS) by using one measurement report message.

Since one measurement report message is used to deliver a measurement result on a plurality of component carriers, a radio resource for message delivery can be saved.

The BS can assign an optimal carrier group to the UE when receiving a measurement result for the plurality of component carriers from the UE. Therefore, the plurality of component carriers can be managed more effectively, and optimal performance can be guaranteed to the UE.

MODE FOR THE INVENTION

Figure 1:
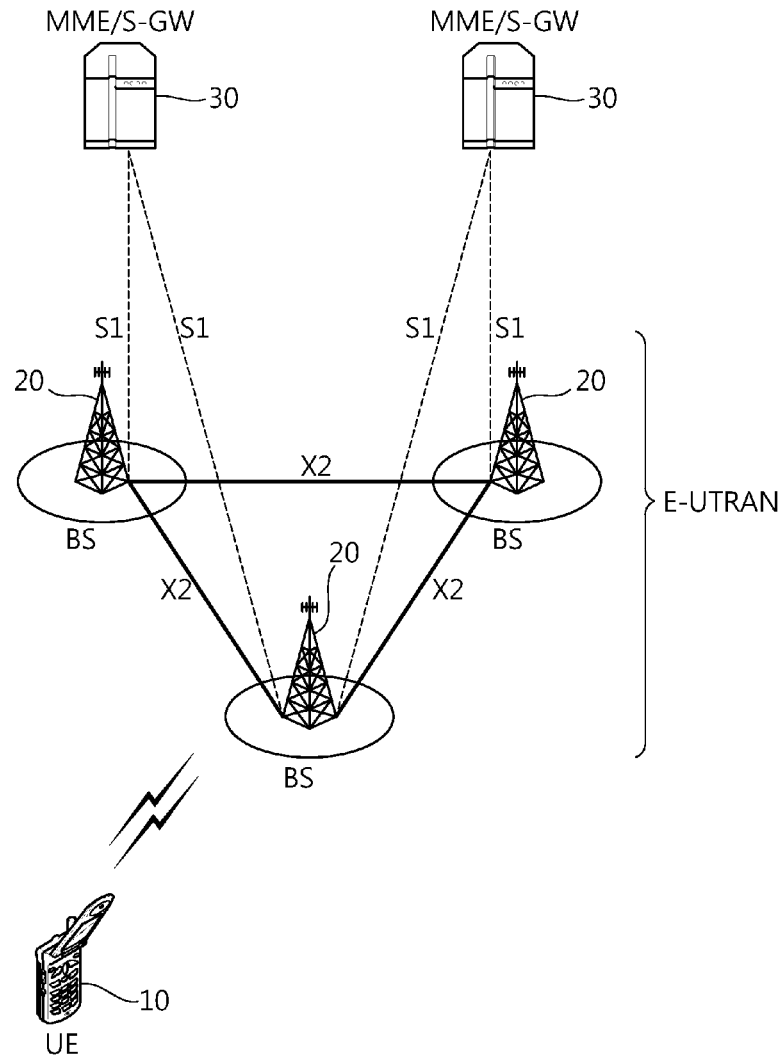
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
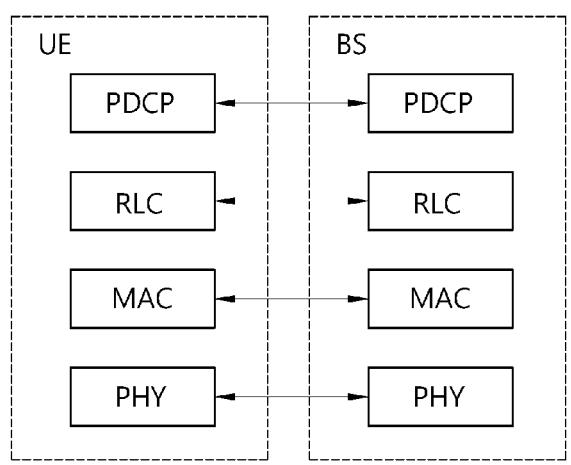
FIG. 2 is a diagram showing a radio protocol architecture for a user plane.
Figure 3:
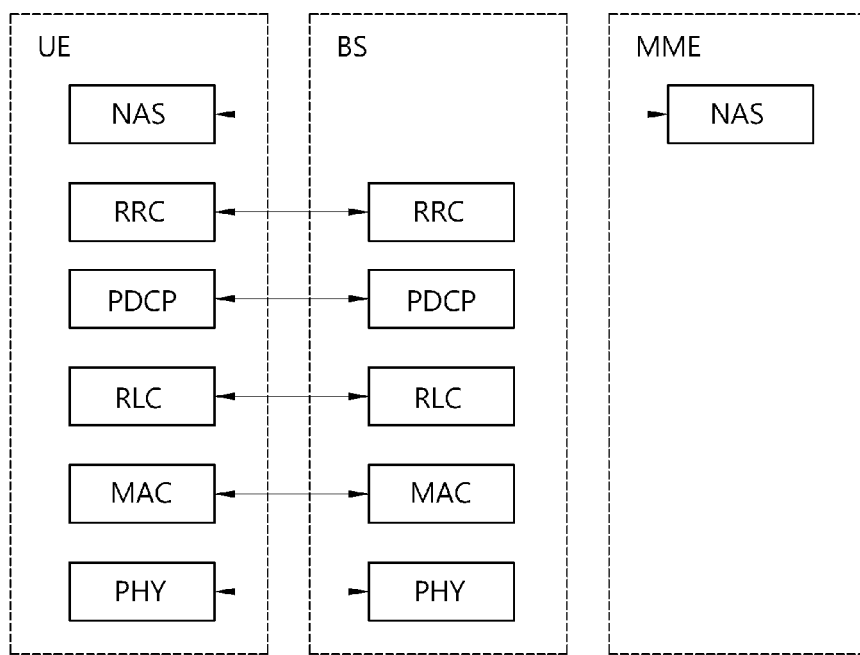
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIG. 2 and FIG. 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network. The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC_CONNECTED mode, and otherwise the UE is in an RRC_IDLE mode.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

Hereinafter, an RRC state of a UE and an RRC connection will be disclosed.

The RRC state indicates whether an RRC layer of the UE is logically connected to an RRC layer of an E-UTRAN. If the two layers are connected to each other, it is called an RRC_CONNECTED state, and if the two layers are not connected to each other, it is called an RRC_IDLE state. When in the RRC_CONNECTED state, the UE has an RRC connection and thus the E-UTRAN can recognize a presence of the UE in a cell unit. Accordingly, the UE can be effectively controlled. On the other hand, when in the RRC_IDLE state, the UE cannot be recognized by the E-UTRAN, and is managed by a core network in a tracking area unit which is a unit of a wider area than a cell. That is, regarding the UE in the RRC_IDLE state, only a presence or absence of the UE is recognized in a wide area unit. To get a typical mobile communication service such as voice or data, a transition to the RRC_CONNECTED state is necessary.

When a user initially powers on the UE, the UE first searches for a proper cell and thereafter stays in the RRC_IDLE state in the cell. Only when there is a need to establish an RRC connection, the UE staying in the RRC_IDLE state establishes the RRC connection with the E-UTRAN through an RRC connection procedure and then transitions to the RRC_CONNECTED state. Examples of a case where the UE in the RRC_IDLE state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a procedure of registering to the network through an initial attach procedure. If the attach procedure is successfully completed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state es-tablishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be disclosed.

The system information includes essential information that must be known to a UE to access a BS. Thus, the UE has to receive all system information before accessing the BS. Further, the UE always has to have the latest system information. Since the system information is information that must be known to all UEs in one cell, the BS periodically transmits the system information.

According to the section 5.2.2 of 3GPP TS 36.331 V8.4.0 (2008-12) "Radio Resource Control (RRC); Protocol specification (Release 8)", the system information is classified into a master information block (MIB), a scheduled block (SB), and a system information block (SIB). The MIB allows the UE to know a physical configuration (e.g., bandwidth) of a specific cell. The SB reports transmission information (e.g., a transmission period or the like) of SIBs. The SIB is a group of a plurality of pieces of system information related to each other. For example, an SIB includes only information of a neighbor cell, and another SIB includes only information of an uplink radio channel used by the UE.

In general, a service provided by the network to the UE can be classified into three types to be described below. Further, according to which service can be provided, the UE recognizes a cell type differently. A service type will be first described below, and then the cell type will be described.

1) Limited service: This service provides an emergency call and an earthquake and tsunami warning system (ETWS), and can be provided in an acceptable cell.

2) Normal service: This service denotes a public use service for general use, and can be provided in a suitable or normal cell.

3) Operator service: This service denotes a service for a network service provider, and a cell can be used only by the network service provider and cannot be used by a normal user.

A service type provided by a cell can be identified as follows.

1) Acceptable cell: A UE can receive a limited service in this cell. This cell is not barred from the perspective of the UE, and satisfies a cell selection criterion of the UE.

2) Suitable cell: The UE can receive a regular service in this cell. This cell satisfies a condition of an acceptable cell, and also satisfies additional conditions. Regarding the additional conditions, this cell has to belong to a PLMN to which the UE can access, and a tracking area update procedure of the UE must not be barred in this cell. If a specific cell is a CSG cell, this cell must be accessible by the UE as a CSG member.

3) Barred cell: Information indicating that a cell is a barred cell is broadcast in this cell by using system information.

4) Reserved cell: Information indicating that a cell is a reserved cell is broadcast in this cell by using system information.

Now, a radio link failure will be described.

A UE persistently performs measurement to maintain quality of a radio link with a serving cell from which the UE receives a service. The UE determines whether communication is impossible in a current situation due to deterioration of the quality of the radio link with the serving cell. If it is determined that the quality of the serving cell is so poor that communication is almost impossible, the UE determines the current situation as a radio link failure.

If the radio link failure is determined, the UE gives up maintaining communication with the current serving cell, selects a new cell through a cell selection (or cell reselection) procedure, and attempts RRC connection re-establishment to the new cell.

Figure 4:
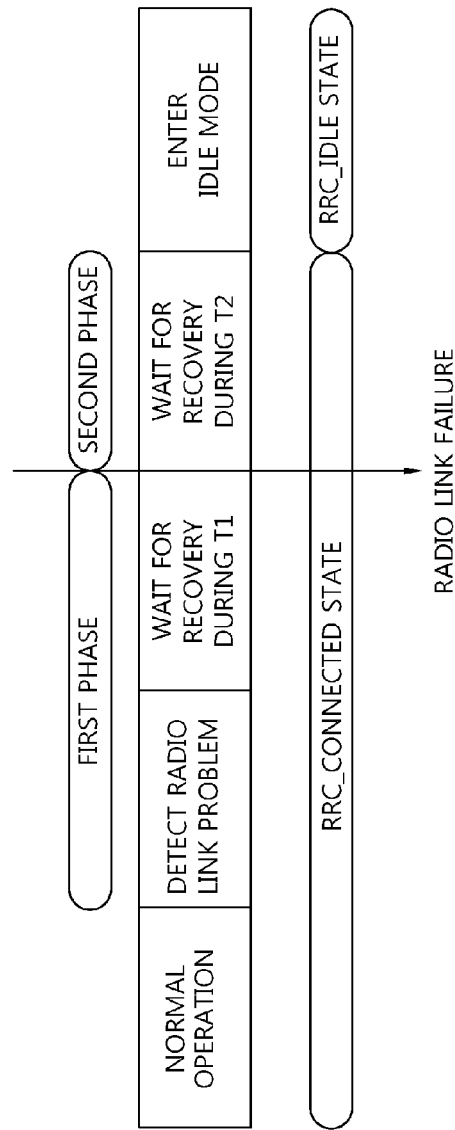
FIG. 4 shows an example of a radio link failure.

FIG. 4 shows an example of a radio link failure. An operation related to the radio link failure can be described in two phases.

In a first phase, while performing a normal operation, a UE determines whether a current communication link has a problem. Upon detecting the problem, the UE declares a radio link problem, and waits for a recovery of the radio link during a first wait time T1. If the radio link is recovered before the expiry of the first wait time T1, the UE re-performs the normal operation. If the radio link is not recovered until the first wait time expires, the UE declares the radio link failure, and enters a second phase.

In the second phase, the UE waits again for the recovery of the radio link during a second wait time T2. If the radio link is not recovered until the second wait time expires, the UE enters an RRC_IDLE state. Alternatively, the UE may perform an RRC re-establishment procedure.

The RRC connection re-establishment procedure is a procedure for re-establishing an RRC connection in an RRC_CONNECTED state. Since the UE does not enter the RRC_IDLE state, the UE does not initiate all connection configurations (e.g., radio bearer configuration, or the like). Instead, when the RRC connection re-establishment procedure starts, the UE temporarily suspends the use of other radio bearers except for an SRB. If the RRC connection re-establishment is successful, the UE resumes the use of radio bearers of which the use is temporarily suspended.

Figure 5:
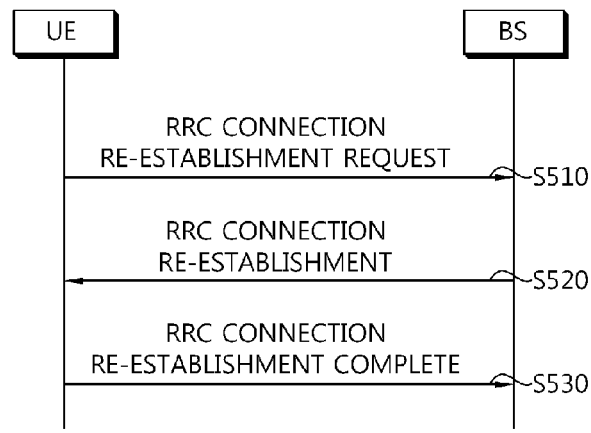
FIG. 5 is a flowchart showing a success of a connection re-establishment procedure.

FIG. 5 is a flowchart showing a success of a connection re-establishment procedure.

A UE performs cell selection to select a cell. The UE receives system information to receive basis parameters for cell access in the selected cell. Then, the UE sends an RRC connection re-establishment request message to a BS (step S510).

If the selected cell is a cell having the context of the UE, i.e., a prepared cell, the BS accepts the RRC connection re-establishment request of the UE, and transmits an RRC connection re-establishment message to the UE (step S520). The UE transmits an RRC connection re-establishment complete message to the BS, and thus the RRC connection re-establishment procedure can be successful (step S530).

Figure 6:
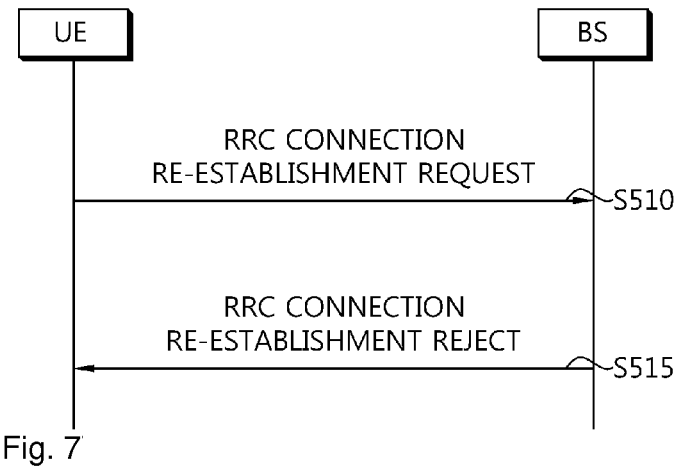
FIG. 6 is a flowchart showing a failure of a connection re-establishment procedure.

FIG. 6 is a flowchart showing a failure of a connection re-establishment procedure. A UE transmits an RRC connection re-establishment request message to a BS (step S510). If a selected cell is not a prepared cell, a BS transmits an RRC connection re-establishment reject message to a UE in response to an RRC connection re-establishment request (step S515).

The following description is related to measurement.

It is necessary for a mobile communication system to support mobility of a UE. Therefore, the UE persistently measures quality of a serving cell providing a current service and quality of a neighbor cell. The UE reports a measurement result to a network at a proper time. The network provides optimal mobility to the UE by using a handover or the like.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identify (also referred to as a global cell identity) of the specific cell, location identification information indicating a location of the specific cell (e.g., a tracking area code), and/or other cell information (e.g., whether it is a member of a closed subscriber group (CSG) cell).

In a state of moving, if the UE determines that quality of a specific region is significantly bad, the UE may report a measurement result and location information on cells with bad quality to the network. The network may attempt to optimize the network on the basis of the measurement result reported from UEs which assist the network operation.

In a mobile communication system having a frequency reuse factor of 1, mobility is generally supported between different cells existing in the same frequency band. Therefore, in order to properly guarantee the UE mobility, the UE has to properly measure cell information and quality of neighbor cells having the same center frequency as a center frequency of a serving cell. Measurement on a cell having the same center frequency as the center frequency of the serving cell is referred to as intra-frequency measurement. The UE performs the intra-frequency measurement and reports a measurement result to the network, so as to achieve the purpose of the measurement result.

A mobile communication service provider may perform a network operation by using a plurality of frequency bands. If a service of a communication system is provided by using the plurality of frequency bands, optimal mobility can be guaranteed to the UE when the UE is able to properly measure cell information and quality of neighbor cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network.

When the UE supports measurement on a heterogeneous network, measurement on a cell of the heterogeneous network may be performed according to a configuration of a BS. Such a measurement on the heterogeneous network is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 200 system conforming to the 3GPP2 standard.

Figure 7:
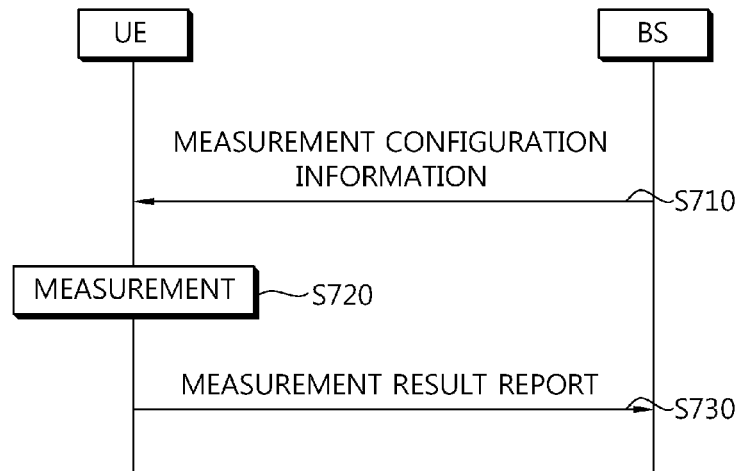
FIG. 7 is a flowchart showing a conventional method of performing measurement.

FIG. 7 is a flowchart showing a conventional method of performing measurement.

A UE receives measurement configuration information from a BS (step S710). A message including the measurement configuration information is referred to as a measurement configuration message. The UE performs measurement based on the measurement configuration information (step S720). If a measurement result satisfies a reporting condition included in the measurement configuration information, the UE reports the measurement result to the BS (step S730). A message including the measurement result is referred to as a measurement report message.

The measurement configuration information may include the following information.

(1) Measurement object information: This information is in regards to an object for which measurement is performed by the UE. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighbor cell having the same frequency band as a frequency band of a serving cell, the inter-frequency measurement object may indicate a neighbor cell having a different frequency band from a frequency band of the serving cell, and the inter-RAT measurement object may indicate a neighbor cell of a different RAT from an RAT of the serving cell.

(2) Reporting configuration information: This information is in regards to a reporting type and a reporting condition regarding when the UE reports a measurement result. The reporting condition may include information on a period or an event for triggering reporting of the measurement result. The reporting type is information indicating a particular type according to which the measurement result is configured.

(3) Measurement identify information: This information is in regards to a measurement identifier for determining when and in what type the UE will report a specific measurement object by associating the measurement object with a reporting configuration. The measurement identify information may be included in the measurement report message to indicate a specific measurement object for which the measurement result is obtained and a specific reporting condition according to which the measurement report is generated.

(4) Quantity configuration information: This information is in regards to a measurement unit, a reporting unit, and/or a parameter for determining filtering of a measurement result value.

(5) Measurement gap information: This information is in regards to a measurement gap as a duration that can be used by the UE only for measurement without consideration of data transmission with a serving cell when downlink transmission or uplink transmission is not scheduled.

To perform a measurement procedure, the UE has a measurement object list, a measurement reporting configuration list, and a measurement identifier list.

In 3GPP LTE, the BS can assign only one measurement object to the UE with respect to one frequency band. Events for triggering measurement reporting shown in the table below are defined in the section 5.5.4 of 3GPP TS 36.331 V8.5.0 (2009-03) "Evolved Universal Terrestrial Radio Access (E-UTRA) Radio Resource Control (RRC); Protocol specification (Release 8)".

TABLE 1

| Event | Reporting Condition |
| --- | --- |
| Event A1 | Serving becomes better than threshold |
| Event A2 | Serving becomes worse than threshold |
| Event A3 | Neighbour becomes offset better than serving |
| Event A4 | Neighbour becomes better than threshold |
| Event A5 | Serving becomes worse than threshold1 and neighbour becomes better than threshold2 |
| Event B1 | Inter RAT neighbour becomes better than threshold |
| Event B2 | Serving becomes worse than threshold1 and inter RAT neighbour becomes better than threshold2 |

If the measurement result of the UE satisfies the determined event, the UE transmits a measurement report message to the BS.

Figure 8:
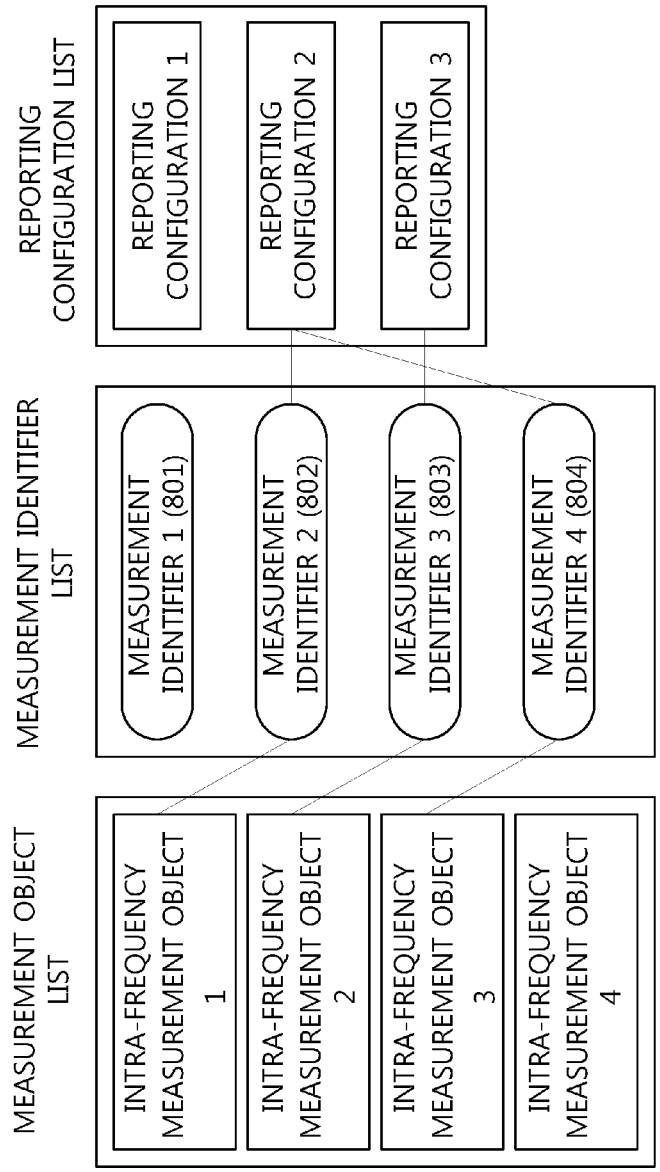
FIG. 8 shows an example of a measurement configuration assigned to a user equipment.

FIG. 8 shows an example of a measurement configuration assigned to a UE.

First, a measurement identifier1 801 associates an intra-frequency measurement object with a reporting configuration 1. The UE performs intra-frequency measurement. The reporting configuration 1 is used to determine a reporting type and a criterion for reporting a measurement result.

A measurement identifier2 802 is associated with the intra-frequency measurement object similarly to the measurement identifier1 801, and associates the intra-frequency measurement object with a reporting configuration 2. The UE performs intra-frequency measurement. The reporting configuration 2 is used to determine a reporting type and a criterion for reporting a measurement result.

By using the measurement identifier1 801 and the measurement identifier2 802, the UE transmits a measurement result even if the measurement result on the intra-frequency measurement object satisfies any one of the reporting configuration 1 and the reporting configuration 2.

A measurement identifier3 803 associates an inter-frequency measurement object 1 with a reporting configuration 3. When a measurement result on the inter-frequency measurement object 1 satisfies a reporting condition included in the reporting configuration 1, the UE reports the measurement result.

A measurement identifier4 804 associates an inter-frequency measurement object 2 with the reporting configuration 2. When a measurement result on the inter-frequency measurement object 2 satisfies a reporting condition included in the reporting configuration 2, the UE reports the measurement result.

Meanwhile, the measurement object, the reporting configuration, and/or the measurement identifier can be added, modified, and/or deleted. To instruct such operations, the BS may transmit to the UE a new measurement configuration message or a measurement configuration modification message.

Figure 9:
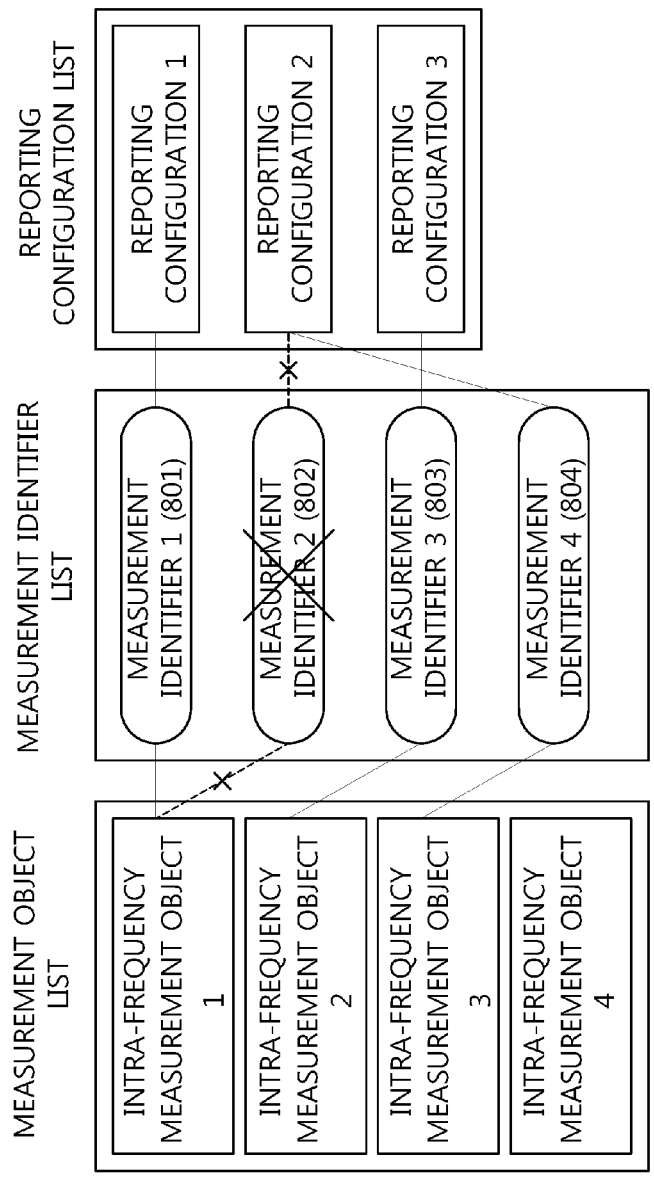
FIG. 9 shows an example of deleting a measurement identifier.

FIG. 9 shows an example of deleting a measurement identifier. When a measurement identifier2 802 is deleted, measurement on a measurement object associated with the measurement identifier2 802 is suspended, and a measurement report is not transmitted. A reporting configuration or a measurement object associated with the deleted measurement identifier may not be modified.

Figure 10:
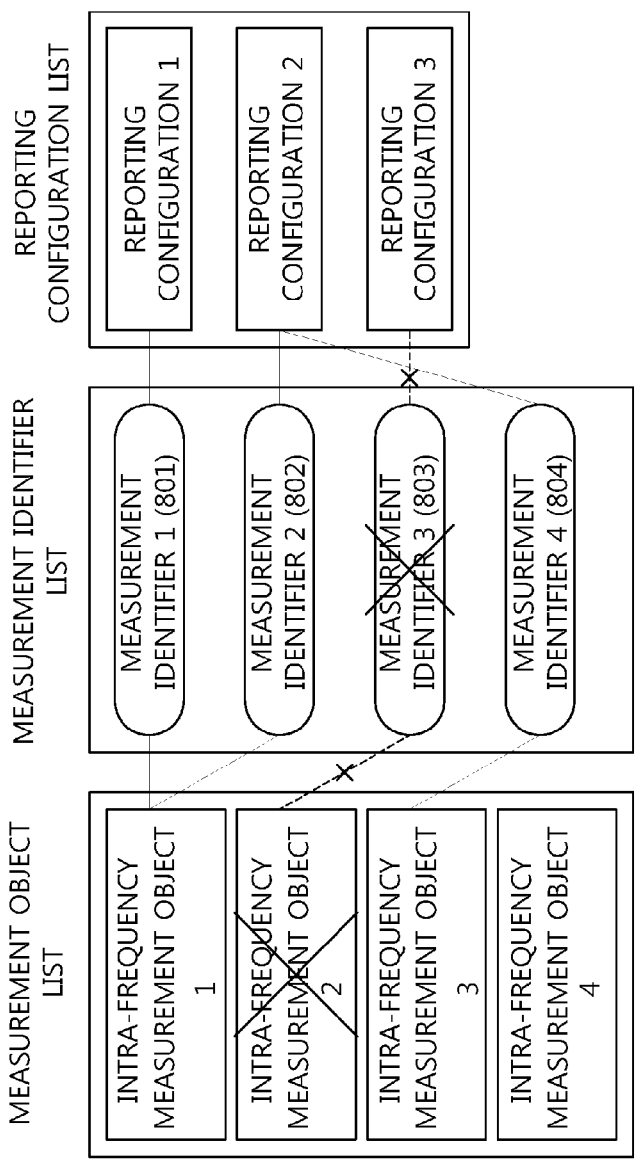
FIG. 10 shows an example of deleting a measurement object.

FIG. 10 shows an example of deleting a measurement object. When an interfrequency measurement object 1 is deleted, a UE also deletes an associated measurement identifier3 803. Measurement on the inter-frequency measurement object 1 is suspended, and a measurement report is not transmitted. However, a reporting configuration associated with the deleted inter-frequency measurement object 1 may not be modified or deleted.

When the reporting configuration is deleted, the UE also deletes an associated measurement identifier. The UE suspends measurement on an associated measurement object according to the associated measurement identifier. Measurement on the measurement object and measurement reporting are suspended. However, a measurement object associated with the deleted reporting configuration may not be modified or deleted.

Now, a multiple carrier system will be described.

A 3GPP LTE system supports a case where a downlink bandwidth and an uplink bandwidth are set differently under the premise that one component carrier (CC) is used. The CC is defined with a center frequency and a bandwidth. This implies that the 3GPP LTE is supported only when the downlink bandwidth and the uplink bandwidth are identical or different in a situation where one CC is defined for each of a downlink and an uplink. For example, the 3GPP LTE system supports up to 20 MHz and the uplink bandwidth and the downlink bandwidth may be different from each other, but supports only one CC in the uplink and the downlink.

A CC may correspond to a cell. A carrier frequency is a center frequency of the CC or a center frequency of the cell. When a UE supports a plurality of CCs, the UE can receive or transmits data through a plurality of CCs corresponding to multiple serving cells.

Spectrum aggregation (or bandwidth aggregation, also referred to as carrier aggregation) supports a plurality of CCs. The spectrum aggregation is introduced to support an increasing throughput, to prevent a cost increase caused by using a broadband radio frequency (RF) element, and to ensure compatibility with legacy systems.

Figure 11:
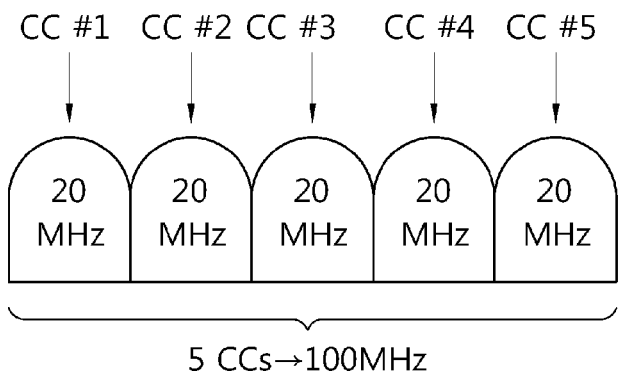
FIG. 11 shows an example of multiple carriers.

FIG. 11 shows an example of multiple carriers. There are five CCs, i.e., CC #1, CC #2, CC #3, CC #4, and CC #5, each of which has a bandwidth of 20 MHz. Therefore, if the five CCs are allocated in a granularity of a CC unit having the bandwidth of 20 MHz, a bandwidth of up to 100 MHz can be supported.

The bandwidth of the CC or the number of the CCs are exemplary purposes only. Each CC may have a different bandwidth. The number of downlink CCs and the number of uplink CCs may be identical to or different from each other.

Figure 12:
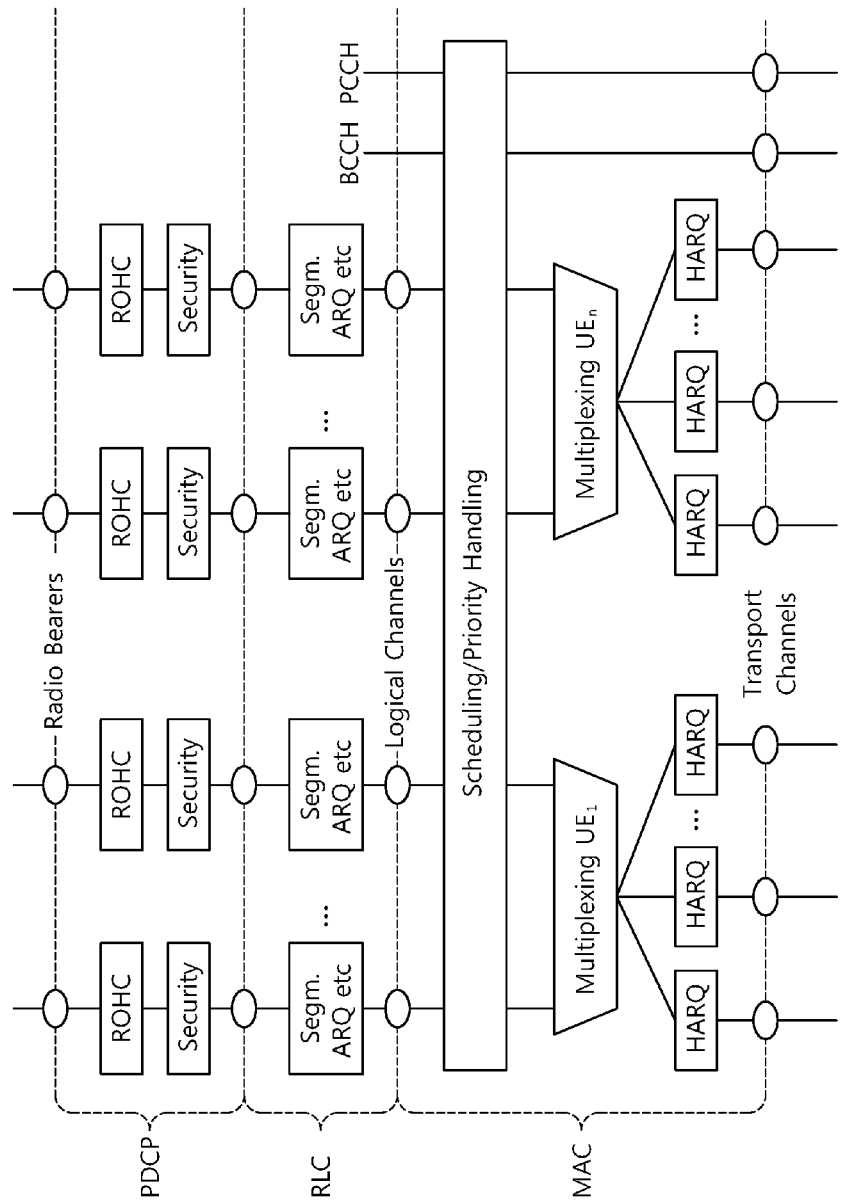
FIG. 12 shows a second-layer structure of a base station for multiple carriers.
Figure 13:
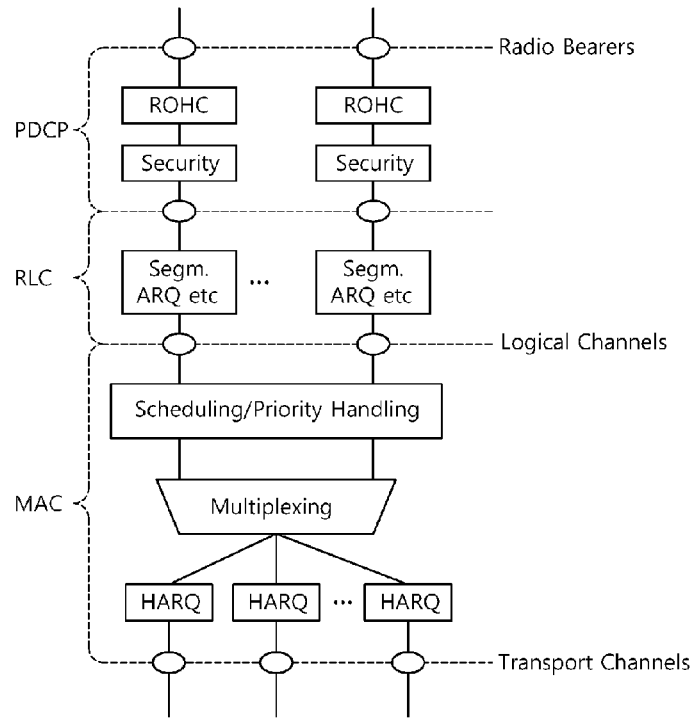
FIG. 13 shows a second-layer structure of a user equipment for multiple carriers.

FIG. 12 shows a second-layer structure of a BS for multiple carriers. FIG. 13 shows a second-layer structure of a UE for multiple carriers.

A MAC layer can manage one or more CCs. One MAC layer includes one or more HARQ entities. One HARQ entity performs HARQ on one CC. Each HARQ entity independently processes a transport block over a transport channel. Therefore, a plurality of HARQ entities can transmit or receive a plurality of transport blocks through a plurality of CCs.

Even if a UE can use a plurality of CCs, the number of CCs simultaneously usable by the UE may be limited according to capability of the UE. A CC supportable by the UE is assigned to the UE by a BS. If the UE can simultaneously use up to M CCs and the number of CCs supported by the BS is N (where $N \geq M$), the BS assigns M CCs with best quality (referred to as best-M CC) among the N CCs so that they can be used by the UE, which is the most desirable in terms of performance of the UE.

The maximum number of available CCs and an optimal CC combination are different from one UE to another. Therefore, in order for the BS to assign optimal M CCs to the UE, a measurement result on the CCs needs to be reported from the UE. If the measurement result on the CCs is modified due to UE mobility or wireless environment modification or other similar reasons, the UE needs to rapidly report the modification to the BS.

However, a measurement procedure of the existing 3GPP LTE is inappropriate to measure CCs and report the best-M CC.

According to a measurement procedure of a current 3GPP LTE system, events for triggering reporting of a measurement result by the UE can be roughly classified into three types.

First, the measurement result is reported when a result obtained by comparing quality of a serving cell of the UE with a threshold satisfies a specific condition. The events A1 and A2 of Table 1 are examples of this case.

Second, the measurement result is reported when a result obtained by comparing quality of a neighbor cell and the quality of the serving cell satisfies a specific condition. The events A3 and A5 of Table 1 are examples of this case.

Third, the measurement result is reported when a result obtained by comparing the quality of the neighbor cell with the threshold satisfies a specific condition. The event A4 of Table 1 is an example of this case.

An event for combining the three cases above is also defined. The event B2 for simultaneously applying the event A2 and the event A4 is an example of this case.

Figure 14:
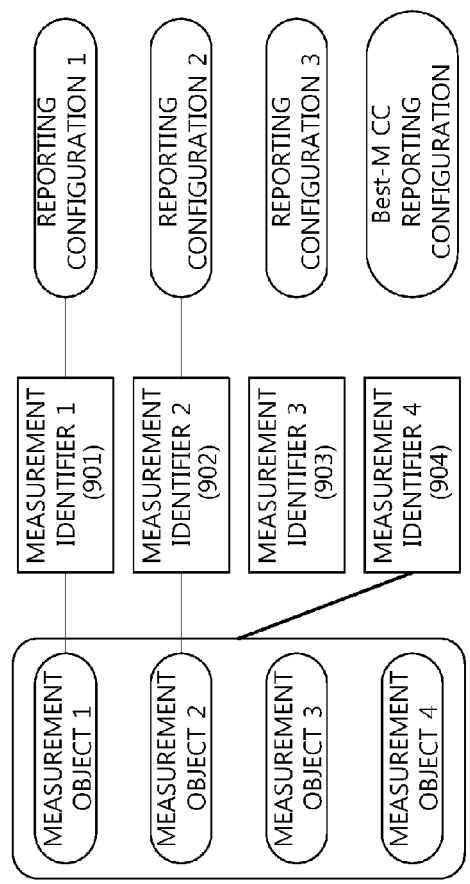
FIG. 14 shows an example of defining a criterion capable of reporting a best-M component carrier (CC).

It can be said that a CC used by the UE corresponds to one cell in a specific frequency band. Therefore, in order for the UE to recognize and report the best-M CC, as shown in FIG. 14, a reporting configuration for defining a criterion for reporting the best-M CC needs to be associated with a plurality of measurement objects.

A measurement identifier4 904 associates measurement objects 1, 2, 3, and 4 with a best-M CC reporting configuration. The best-M CC reporting configuration includes a reporting type and a reporting condition for triggering reporting of the best-M CC.

However, in the conventional measurement configuration structure, the measurement configuration can be associated only with one measurement object.

When measurement objects and reporting configurations are associated with each other in a one-to-one manner, the UE reports a measurement result individually to each measurement object, and if the number of measurement objects increases, the number of times of transmitting a measurement report message by the UE also increases. If the reporting configuration includes an inappropriate configuration value (e.g., an inappropriate event threshold), measurement reporting of the UE may be excessively frequently triggered or, on the contrary, reporting of the measurement result may be significantly delayed.

Now, a measurement model capable of obtaining a measurement result by comparing quality of measurement objects each of which is present across a plurality of frequencies is proposed, and a method of reporting a best-M CC of a UE on the basis of the measurement model is proposed.

Hereinafter, a measurement object may include an intra-frequency measurement object, an inter-frequency measurement object, an intra-RAT measurement object, a CC, and/or a cell of the CC. The measurement object may be a specific frequency band (e.g., CC) unit or a cell unit. A plurality of cells may be present in one frequency band or one CC.

A measurement reporting configuration includes a reporting condition (also referred to as a triggering condition or an event condition) for triggering reporting of the measurement result.

Figure 15:
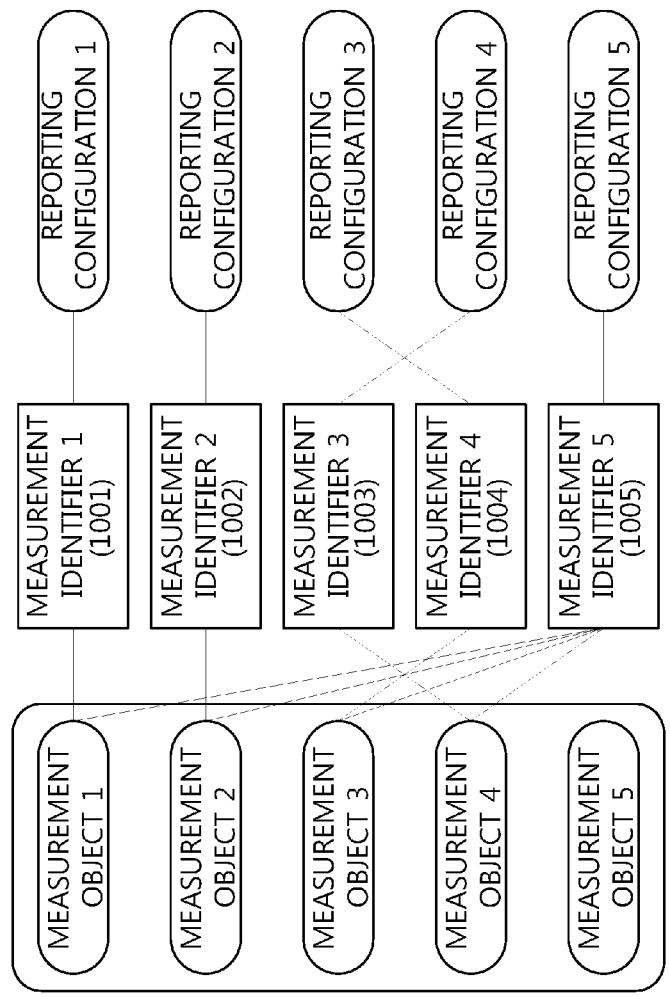
FIG. 15 shows a measurement model according to an embodiment of the present invention.

FIG. 15 shows a measurement model according to an embodiment of the present invention. In this case, one measurement identifier is associated with a plurality of measurement objects. This model is referred to as a first measurement model.

A measurement identifier1 1001, a measurement identifier2 1002, a measurement identifier3 1003, and a measurement identifier4 1004 associate measurement objects with measurement reporting configurations in a one-to-one manner.

A measurement identifier5 1005 associates measurement objects 1, 2, 3, and 4 with a measurement reporting configuration 5. This identifier is different from the conventional measurement identifier in a sense that a plurality of measurement objects are associated with a measurement reporting configuration, and such an identifier is referred to as a multiplexing measurement identifier.

Accordingly, since one measurement reporting configuration is associated with a plurality of measurement objects, a measurement report may also be associated with the plurality of measurement objects.

An association relation between the measurement identifier and the plurality of measurement objects may be explicitly determined when a BS assigns a measurement configuration to a UE. For example, the measurement identifier5 1005 can be configured as follows.

Multiplexing measurement identifier={
Associated measurement object list={Measurement object 1, Measurement object 2, Measurement object 3, Measurement object 4},
Associated measurement reporting configuration={Measurement reporting configuration 5}
}

The multiplexing measurement object may be implicitly determined. For example, in a multiple carrier system, a plurality of CCs may be usable by a BS, and the BS may report, in advance, information on each available CC to a UE. If the multiplexing measurement object and a measurement reporting configuration for multiple carriers are pre-defined, the UE may obtain information on an available CC and thereafter may associate each CC as a measurement object with the multiplexing measurement identifier without additional signaling.

Figure 16:
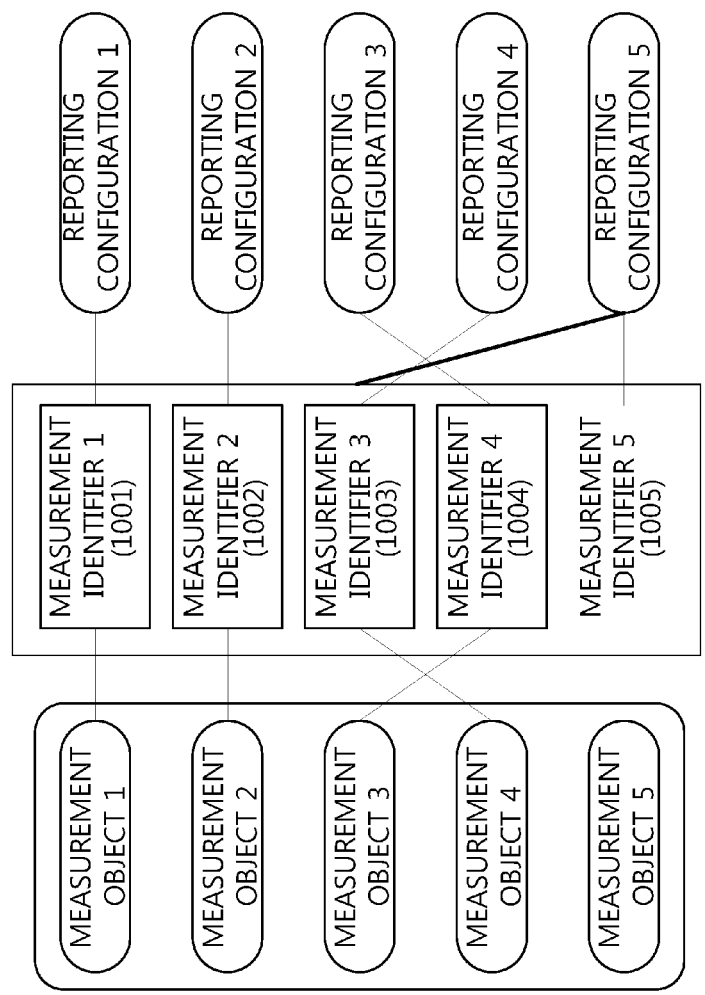
FIG. 16 shows a measurement model according to another embodiment of the present invention.

FIG. 16 shows a measurement model according to another embodiment of the present invention. In comparison with the embodiment of FIG. 15, a multiplexing measurement identifier includes a measurement identifier, so as to associate a plurality of measurement objects with a measurement reporting configuration. This model is referred to as a second measurement model.

A measurement identifier5 1105 is associated with a measurement reporting configuration 5 associated with plurality of frequencies. The measurement identifier5 1105 includes a measurement identifier1 1101, a measurement identifier2 1102, a measurement identifier3 1103, and a measurement identifier4 1104. Each of the measurement identifier1 1101, the measurement identifier2 1102, the measurement identifier3 1103, and the measurement identifier4 1104 is associated with one measurement object. Consequently, by the use of the measurement identifier5 1105, the measurement reporting configuration 5 is associated with a plurality of measurement objects. The measurement reporting configuration 5 is associated with a measurement object associated with each measurement identifier belonging to a measurement identifier list included in the measurement identifier 5 which is a multiplexing measurement identifier.

The second measurement model in which measurement identifiers and measurement objects are associated with each other in a one-to-one manner has an advantage in that the conventional measurement model structure and its associated measurement reporting configuration can be reused.

The measurement identifier5 1105 which is a multiplexing measurement identifier can be configured as follows.

Multiplexing measurement identifier={
Measurement identifier list={Measurement identifier 1, Measurement identifier 2, Measurement identifier 3, Measurement identifier 4},
Associated measurement reporting configuration={Measurement reporting configuration 5}
}

Figure 17:
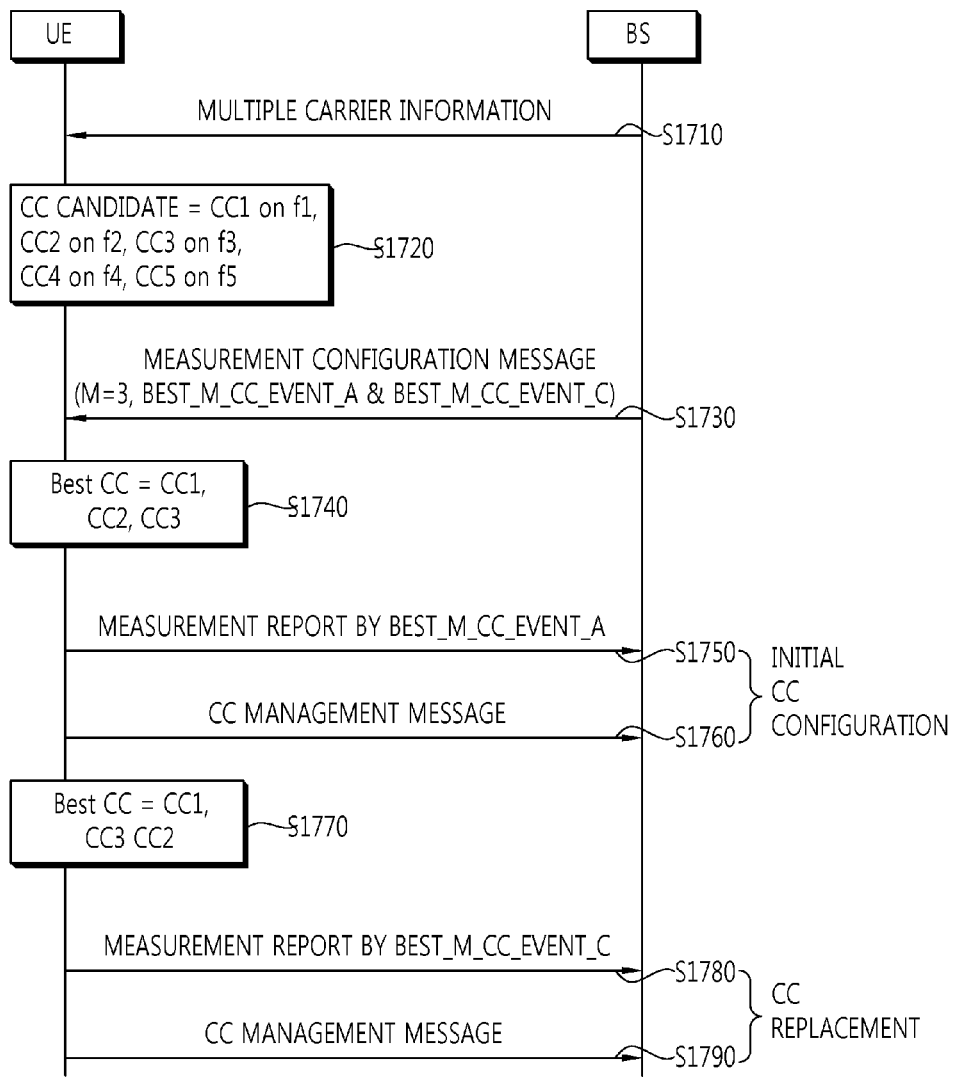
FIG. 17 shows a method of reporting a measurement result according to an embodiment of the present invention.

FIG. 17 shows a method of reporting a measurement result according to an embodiment of the present invention. In this method, a UE reports a measurement result on selected M CCs on the basis of a measurement result on N CCs.

A BS reports multiple carrier information to the UE (step S1710). The multiple carrier information includes the number of CCs and information indicating which frequency is used by each CC. Further, the multiple carrier information may be used to report which cell is usable as a CC to the UE. The multiple carrier information may be transmitted by using a part of system information or an RRC message.

The UE determines a CC candidate based on the multiple carrier information (step S1720). The CC candidate is a CC usable by the UE. A part or entirety of the CC candidate is a measurement object. It is assumed herein that the number of CC candidates is 5 (i.e., N=5), and CCs 1, 2, 3, 4, and 5 are respectively present at frequencies f1, f2, f3, f4, and f5.

The BS transmits a measurement configuration message including measurement configuration information to the UE (step S1730). The measurement configuration information includes a reporting configuration for reporting a best-M CC. The measurement configuration message may be an RRC connection reconfiguration message.

An event for triggering reporting of the measurement result included in the reporting configuration may be as follows.

TABLE 2

| Event | Reporting Cndition |
|---|---|
| BEST_M_CC_EVENT_A | Trigger reporting if UE first recognizes best-M CC. |
| BEST_M_CC_EVENT_B | Trigger reporting if UE has previously reported best-M CC and if newly measured best-M CC list is different from previously reported best-M CC list. |
| BEST_M_CC_EVENT_C | Trigger reporting if UE has previously reported best-M CC and if order of CC quality in newly measured best-M CC list is different from order of CC quality in previously reported best-M CC list. |

In addition, the measurement configuration information may include a CC candidate list which includes one or more candidate CCs to be measured by the UE, and a CC in the CC candidate list is a measurement object associated with the reporting configuration. A CC of another frequency not belonging to a measurement object assigned to the UE may be included in the CC candidate list. If another CC is included in the CC list except for CC candidates included in the multiple carrier information, the CC candidates included in the multiple carrier information may be ignored in a measurement procedure, and a CC candidate list received using the measurement configuration information may be used instead.

It is assumed herein that M=3. That is, a measurement result on 3 best CC candidates is reported, and measurement objects are 5 CCs. Further, it is assumed that an event included in a reporting configuration is BEST_M_C-C_EVENT_A and BEST_M_CC_EVENT_C.

Upon receiving a measurement configuration message for reporting the best-M CC, the UE starts to perform measurement on the measurement objects.

The UE determines whether a reporting condition included in the reporting configuration is satisfied (step S1740). BEST_ M_CC_EVENT_A and BEST_M_CC_EVENT_C are determined as events. When the UE determines a best-3 CC in the order of the CC1, the CC2, and the CC3, the BEST_M_ CC_EVENT_A is satisfied and thus reporting of a measurement result is triggered.

The UE transmits a measurement report message including the measurement result to the BS (step S1750).

The measurement result may include information on M CCs with best quality. At least one of a CC identifier of each CC, an absolute radio-frequency channel number (ARFCN) of the CC, an identifier of a measurement object of the CC, and a cell identifier of the CC may be used for identification.

The measurement result may include a quality value of each of the M CCs (or M cells) with best quality. The measurement result may include a quality value of a determined CC in addition to the best-M CC. The measurement result may include a quality value of a neighboring cell at the frequencies of the best-M CCs. Reference signal received power (RSRP) or reference signal received quality (RSRQ) may be used as the quality value.

The measurement configuration information may include a quality threshold which is used to determine whether measurement result of a cell (or a CC) is included in the measurement report message. The UE report a cell of which measurement result is over the quality threshold.

Upon receiving the measurement result of the best-M CC, the BS transmits a CC management message to indicate an addition of new CC (step S1760). When the UE initially accesses to the BS, the UE uses only one serving cell, i.e. one CC. By acquiring addition of new CC via the CC management message, the UE can utilize a plurality of CC.

Upon receiving the measurement result of the best-M CC, the BS transmits a CC management message to indicate a modification of previous CCs.

Upon receiving the measurement result, the BS transmits a CC management message to indicate activation or inactivation of a CC to be used. For example, the CC1 and the CC2 having best quality are used as active CCs. An active CC is a CC used by the UE for data transmission or reception. An inactive CC is a CC which is not used by the UE for data transmission or reception and is used to perform a minimum operation such as measurement.

Next, the UE determines whether the reporting condition included in the reporting configuration is satisfied (step S1770). BEST_M_CC_EVENT_A and BEST_M_C-C_EVENT_C are determined as events. When the UE determines a best-3 CC in the order of the CC1, the CC3, and the CC2, the BEST_M_CC_EVENT_C is satisfied and thus reporting of a measurement result is triggered.

The UE transmits a measurement result report message including the measurement result to the BS (step S1780).

When the measurement result is reported, the BS transmits a CC management message (step S1790). For example, the CC1 and the CC3 are used as active CCs, and the CC2 is used as an inactive CC.

Figure 18:
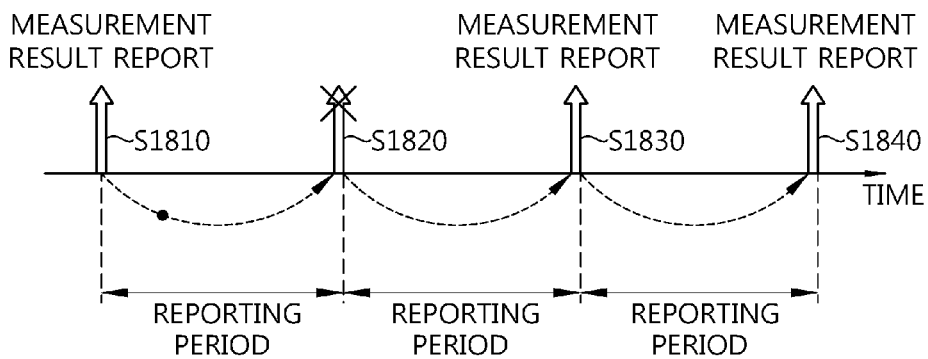
FIG. 18 shows a method of reporting a measurement result according to another embodiment of the present invention.

FIG. 18 shows a method of reporting a measurement result according to another embodiment of the present invention. In this method, a reporting period is determined in addition to a reporting condition for reporting a measurement result. Whether the reporting condition is satisfied is periodically determined, and if the reporting condition is satisfied, a UE reports the measurement result to a BS.

After the UE initially determines a best-M CC, the UE reports a measurement result on the best-M CC to the BS (step S1810). The UE starts a periodic reporting timer. While the periodic reporting timer is operating, the UE recognizes the best-M CC. The UE can report a best-M CC measurement result to the BS at the expiry of the periodic reporting timer.

When the periodic reporting timer expires, if a best-M CC list to be reported is equal to a previously reported best-M CC list, the UE may skip reporting of the measurement result (step S1820). On the contrary, even if the best-M CC list to be reported is equal to the previously reported best-M CC list, the UE may not skip reporting of the measurement result in order to report measurement quality of CCs.

Figure 19:
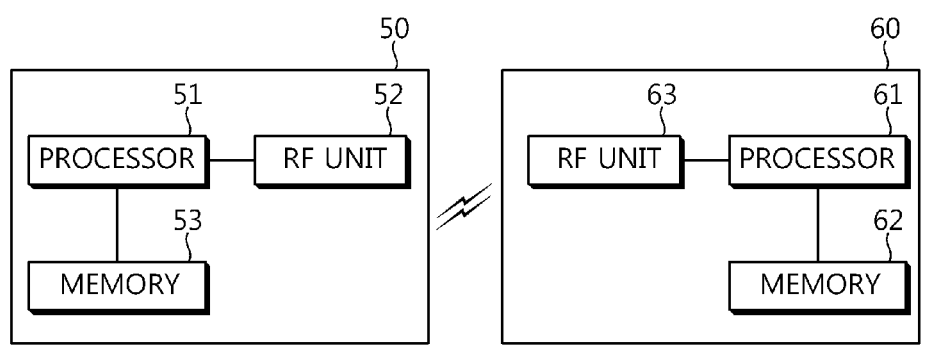
FIG. 19 is a block diagram showing wireless communication system to implement an embodiment of the present invention.

FIG. 19 is a block diagram showing wireless communication system to implement an embodiment of the present invention.

A BS 50 may include a processor 51, a memory 52 and a radio frequency (RF) unit 53. The memory 52 is operatively coupled with the processor 51 and stores a variety of information to operate the processor 51. The RF unit 53 is operatively coupled with the processor 11, and transmits and/or receives a radio signal.

The processor 51 may be configured to implement proposed functions, procedures and/or methods described in this description. Layers of the radio interface protocol may be implemented in the processor 51. The processor 51 may support multiple carriers. The processor 51 may send a measurement configuration message to a UE to configure reporting configurations for a plurality of CCs. The processor 51 may activate or deactivate CCs based on the best-M CC received from the UE.

A UE 60 may include a processor 61, a memory 62 and a RF unit 63. The memory 62 is operatively coupled with the processor 61 and stores a variety of information to operate the processor 61. The RF unit 63 is operatively coupled with the processor 61, and transmits and/or receives a radio signal.

The processor 61 may be configured to implement proposed functions, procedures and/or methods described in this description. Layers of the radio interface protocol may be implemented in the processor 61. The processor 61 may measure the plurality of CCs based on the measurement configuration. When a reporting condition is satisfied to trigger the reporting of a measurement result, the measurement result for the best-M CC is reported to the BS.

The processors 51, 61 may include application-specific integrated circuit (ASIC), other chipset, logic circuit and/or data processing device. The memories 52, 62 may include read-only memory (ROM), random access memory (RAM), flash memory, memory card, storage medium and/or other storage device. The RF units 53, 63 may include baseband circuitry to process radio frequency signals. When the embodiments are implemented in software, the techniques described herein can be implemented with modules (e.g., procedures, functions, and so on) that perform the functions described herein. The modules can be stored in memories 52, 62 and executed by processors 51, 61. The memories 52, 62 can be implemented within the processors 51, 61 or external to the processors 51, 61 in which case those can be communicatively coupled to the processors 51, 61 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method of reporting a measurement result in a wireless communication system, the method comprising:
   receiving, from a base station, measurement configuration information comprising a reporting condition for triggering reporting of a measurement result on M component carriers among N component carriers,
   wherein $M \leq N$;
   determining whether the reporting condition is satisfied by measuring the N component carriers; and
   reporting a measurement result on the M component carriers to the base station if the reporting condition is satisfied,
   wherein the M component carriers comprise component carriers having best quality among the N component carriers, and
   wherein the reporting condition is to trigger the reporting of the measurement result when an order of quality of newly selected M component carriers is different from an order of quality of previously reported M component carriers.

2. The method of claim 1, wherein whether the reporting condition is satisfied is determined periodically.

3. The method of claim 1, wherein the reporting condition is to trigger the reporting of the measurement result when the M component carriers are determined.

4. The method of claim 1, further comprising receiving a management message for activating or inactivating at least one of the N component carriers from the base station.

5. The method of claim 1, wherein the measurement result comprises an identifier for identifying the M component carriers.

6. The method of claim 5, wherein the measurement result further comprises a quality value of the M component carriers.

7. A user equipment for reporting a measurement result in a wireless communication system, the user equipment comprising:
   a radio frequency (RF) unit configured to transmit and receive a radio signal; and
   a processor operatively coupled to the RF unit and configured to implement a radio interface protocol, wherein the processor is further configured to:
   receive, from a base station, measurement configuration information comprising a reporting condition for triggering reporting of a measurement result on M component carriers among N component carriers,
   wherein $M \leq N$;
   determine whether the reporting condition is satisfied by measuring the N component carriers; and
   report a measurement result on the M component carriers to the base station if the reporting condition is satisfied,
   wherein the M component carriers comprise component carriers having best quality among the N component carriers, and
   wherein the reporting condition is to trigger the reporting of the measurement result when an order of quality of newly selected M component carriers is different from an order of quality of previously reported M component carriers.

8. The user equipment of claim 7, wherein the processor is configured to periodically determine whether the reporting condition is satisfied.

* * * * *